United States Patent [19]

Lennon

[11] Patent Number: 4,878,397

[45] Date of Patent: Nov. 7, 1989

[54] BICYCLE, HANDLEBAR AND ADAPTER SYSTEM

[76] Inventor: Dan C. Lennon, Box 1177, Hailey, Id. 83333

[21] Appl. No.: 173,765
[22] Filed: Mar. 28, 1988

Related U.S. Application Data

[63] Continuation-in-part of Ser. No. 1,616, Jan. 9, 1987, Pat. No. 4,750,754.

[51] Int. Cl.$^4$ .................. B62K 21/12; B62K 21/26
[52] U.S. Cl. ................. 74/551.1; 74/551.8; 74/551.9
[58] Field of Search ........... 280/261, 289 H, 281 LP; 74/551.1, 551.2, 551.3, 551.4, 551.6, 551.8, 551.9

[56] References Cited

U.S. PATENT DOCUMENTS

| | | | |
|---|---|---|---|
| 313,234 | 3/1885 | Powers | 74/551.2 |
| 566,201 | 8/1896 | MacKinnon et al. | 280/270 |
| 581,260 | 4/1897 | Biddle | 74/551.8 |
| 587,626 | 8/1897 | Vollmer | 74/551.9 |
| 602,016 | 4/1898 | Johnson | 74/551.1 |
| 614,774 | 11/1898 | Spiker | 74/551.1 X |
| 717,662 | 1/1903 | Ellison | 74/551.8 |
| 944,932 | 12/1909 | Abraham | 74/551.8 |
| 2,059,669 | 5/1935 | Skoog | 74/551.8 |
| 2,491,609 | 12/1949 | George | 74/551.1 X |
| 2,618,447 | 11/1952 | LeCarme | 244/83 |
| 2,699,203 | 1/1955 | White | 248/231 X |
| 2,816,775 | 12/1957 | Costello | 74/551.8 X |
| 2,929,641 | 3/1960 | Alvistur | 280/261 |
| 3,529,490 | 9/1970 | Pawsat | 74/551.8 X |
| 3,884,092 | 5/1975 | Raudebaugh | 74/558.5 |
| 3,937,629 | 2/1976 | Hamasaka | 74/551.8 |
| 3,945,337 | 3/1976 | Sweetman | 74/551.8 X |
| 3,966,229 | 6/1976 | Foster | 280/261 |
| 4,250,770 | 2/1981 | Robertson | 74/551.8 |
| 4,342,175 | 8/1982 | Cernansky et al. | 280/279 X |
| 4,384,497 | 5/1983 | Gatsos | 74/551.4 |
| 4,474,386 | 10/1984 | Kanemaki | 280/289 |
| 4,493,225 | 1/1985 | Galahad | 74/551.3 |
| 4,548,092 | 10/1985 | Strong, Jr. | 74/475 |

FOREIGN PATENT DOCUMENTS

| | | | |
|---|---|---|---|
| 569239 | 9/1987 | Australia . | |
| 451284 | 9/1948 | Canada | 74/551.1 |
| 35359 | 9/1981 | European Pat. Off. . | |
| 73010 | 11/1892 | Fed. Rep. of Germany | 74/551.9 |
| 794122 | 2/1936 | France . | |
| 1539632 | 9/1968 | France . | |
| 1159826 | 12/1983 | U.S.S.R. . | |
| 15018 | 9/1895 | United Kingdom | 74/551.1 |
| 479565 | 2/1938 | United Kingdom . | |

OTHER PUBLICATIONS

Bicycle Guide Magazine, Publication Date Nov./Dec. 1986, p. 44 et seq.
Outside Magazine, Publication Date Nov. 1986, pp. 55 et seq.
1985 Huffy Bicycle Merchandising Catalog.
Bicycle Guide Magazine, Publication Date Sept./Oct. 1986, pp. 46 and 88.

*Primary Examiner*—John A. Pekar
*Attorney, Agent, or Firm*—Jenner & Block

[57] ABSTRACT

Novel handlebars for a bicycle are disclosed. The handlebars include a crosspiece connected to a bicycle steering post with sideways portions extending therefrom. The handlebars of the invention have hand grip portions that are located relatively close together to encourage the rider to adopt a riding position in which the frontal area of the rider's silhouette is minimized, and in which the rider's elbows are located ahead of the rider's lungs. Turned handlebar portions extend from the sideways portions and extend generally forwardly and inwardly to define a pair of forward handle portions spaced apart a distance less than the width of the crosspiece. A front loop portion interconnects the forward handle portions so that all of the portions define a continuous loop forward of the steering post.

A handlebar adapter is provided for a bicycle having an original handlebar. The adapter is a generally U-shaped extension loop that projects forwardly away from the rider and defines a pair of handgrip positions in which the rider's arms extend forwardly toward the handgrip portions and the rider's elbows are loctated near the original handlebar.

An adapter is also provided for a bicycle with forwardly extending portions terminating in a pair of handgrips. The adapter includes structure to interconnect the pair of handgrips.

42 Claims, 3 Drawing Sheets

U.S. Patent  Nov. 7, 1989  Sheet 1 of 3  4,878,397
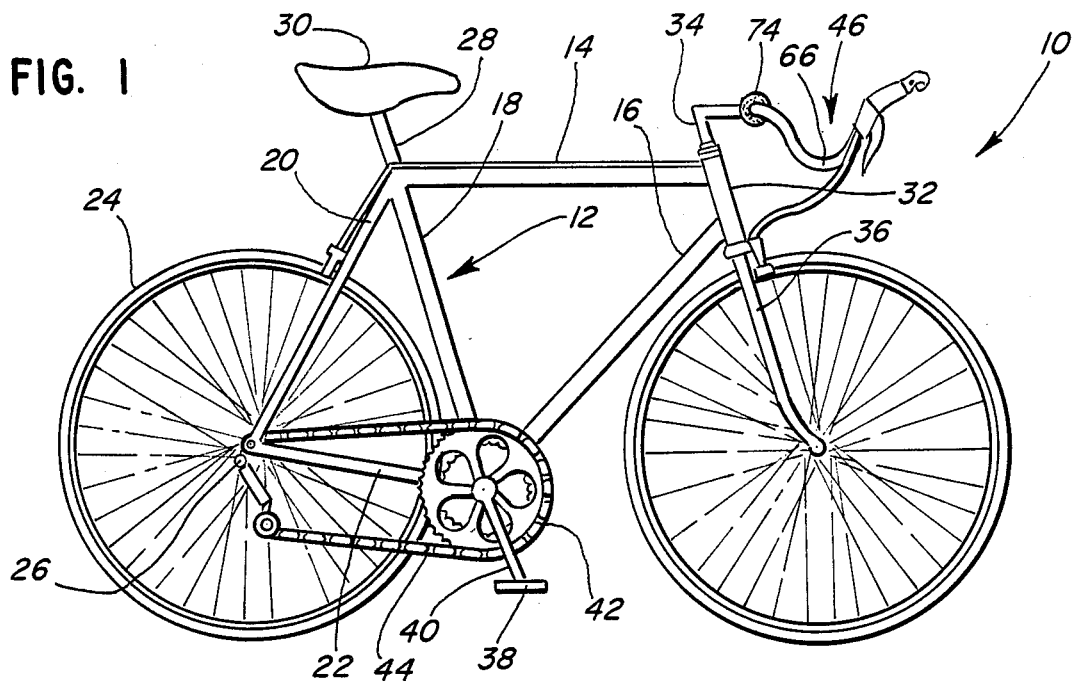
FIG. 1
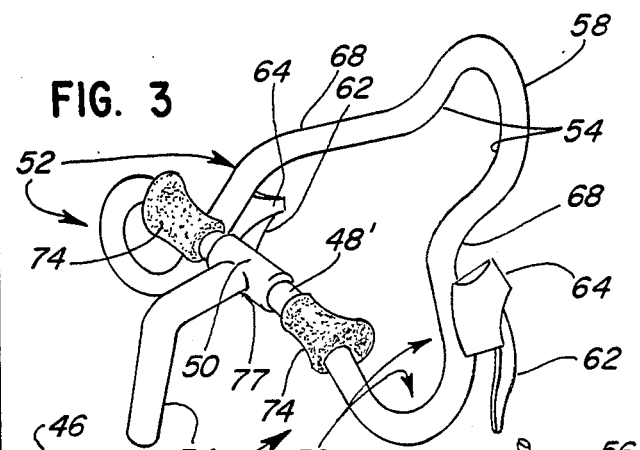
FIG. 3
FIG. 2
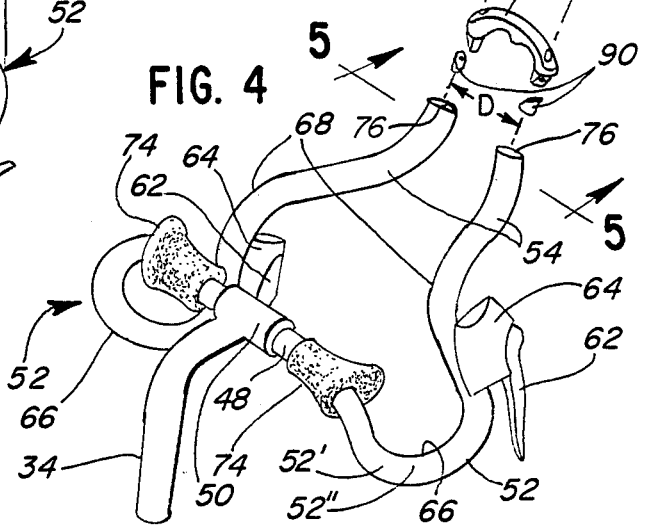
FIG. 4

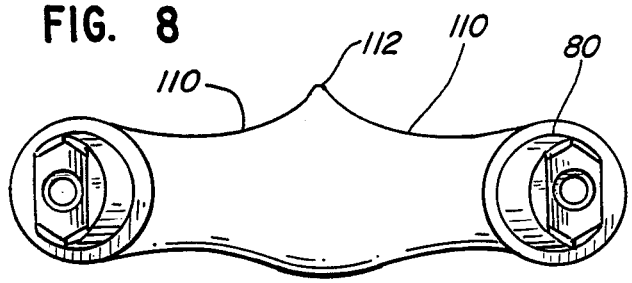
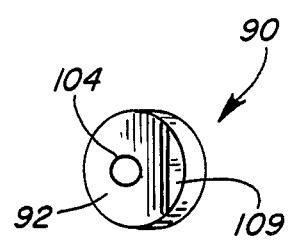
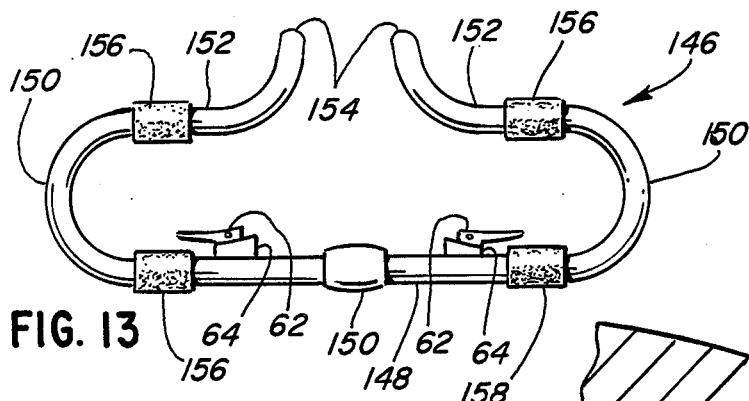
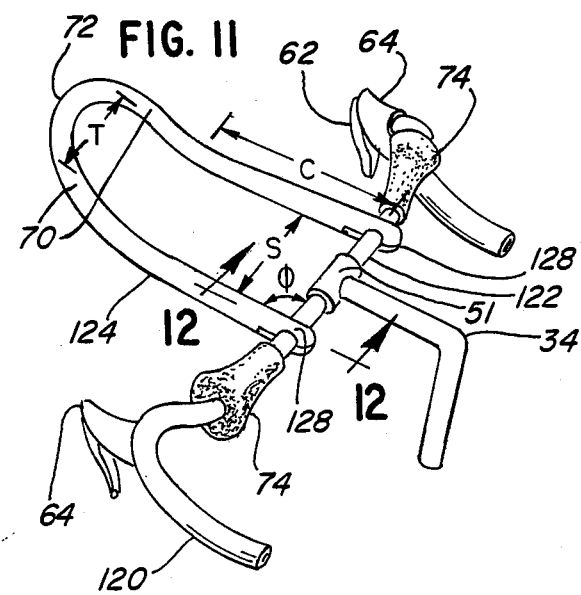
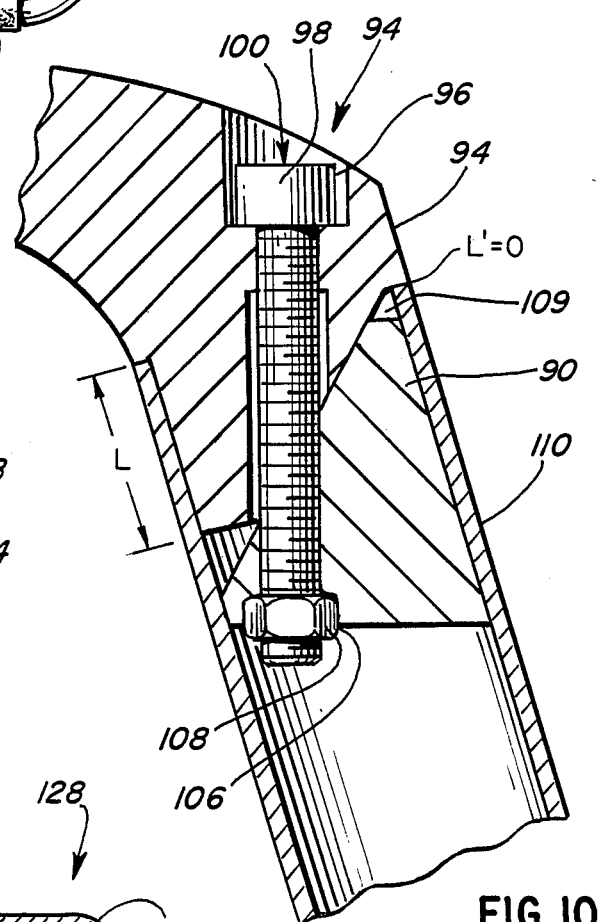
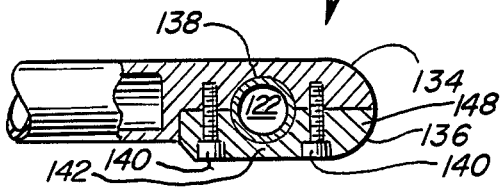

BICYCLE, HANDLEBAR AND ADAPTER SYSTEM

RELATED APPLICATION

This application is a continuation-in-part application of U.S. patent application Ser. No. 001,616 filed Jan. 9, 1987 now U.S. Pat. No. 4,750,754 issued June 14, 1988, the disclosure of which is hereby incorporated by reference.

BACKGROUND OF THE INVENTION

This invention relates to bicycles and handlebars therefor which are adapted to improve the performance and stamina of the rider.

The design of racing bicycles, or other special-purpose bicycles, is especially complex. Structural changes which may at first seem minor to the unskilled can provide significant improvement in bicycle performance. This improved performance can provide recognizable advantage to the bicycle rider.

To perform well in bicycle race competition (especially a competition of extended duration or length) a minimized frontal area and shape should be presented by the combination of the bicycle and the bicycle rider. Frontal area minimization is not enough, however; the position of the bicycle rider must be comfortable so that the rider can produce requisite high levels of effort and performance for long periods of time.

Frontal areas and rider positions are greatly affected by the position, shape, and arrangement of the bicycle handlebars. Simply as an example, a bicycle having handlebar grips located in a relatively raised position will encourage a rider to assume a relatively upright riding position. While this position may be comfortable, a large frontal area is presented, and the relatively large ensuing wind resistance minimizes top speed even though the rider may be producing a large amount of pedaling effort. Conversely, a bicycle having relatively low-set handlebars encourages the rider to assume a position in which the frontal area is minimized. Small frontal area results in higher top speed with less rider effort. But in prior racing bicycles, the rider is fatigued over time due to the crouched position and is not able to sustain endurance through a long race.

It is an object of the present invention to provide a bicycle and handlebar system located and oriented so as to encourage the bicycle rider to assume an efficient, yet comfortable, riding position which can be sustained over long periods of time. It would also be desirable to provide such a handlebar that would not be objectionable for mass-start bicycle events as a result of the handlebar pointing forward and being open ended.

Another object is to provide handlebars for a bicycle which will encourage the cyclist to assume a comfortable and efficient position on the bicycle when the handlebars are properly mounted on the bicycle.

SUMMARY OF THE INVENTION

In accordance with the present invention, novel bicycle and handlebar systems improve the aerodynamic silhouette and the endurance of the rider. The most desirable modes involve entirely new designs for the handlebars. However, many of the advantages can be obtained by an adapter kit by which a new handlebar system can be attached to an existing bicycle.

The handlebars in accordance with the invention are connectable to a bicycle steering post located forwardly of a bicycle seat and include a crosspiece connected to a bicycle steering post with sideways portions extending therefrom. Turned handlebar portions extend from the sideways portions and extend generally forwardly and inwardly to define a pair of forward handle portions spaced apart a distance less than the width of the crosspiece. A front loop portion interconnects the forward handle portions so that all the portions define a continuous loop forward of the steering post.

In accordance with another embodiment of the invention, an adapter for a bicycle having a handlebar with forwardly extending portions that terminate in a pair of handgrips is provided. The adapter comprises a handlebar member that includes a pair of connectors that are detachably connectable with the associated one of the pair of handgrips to interconnect the pair of handgrips through the body of the handlebar member.

In accordance with still another embodiment of the invention, an adapter kit for a bicycle having an original handlebar connected to a steering post is provided. The adapter kit comprises a generally U-shaped extension loop having at the ends of the loop a pair of clamps for engaging the original handlebars on opposite sides of the steering post, the extension loop projecting forwardly from each clamp and away from the rider and defining a pair of handgrip positions near the center neck of the U-shaped extension loop to define a rider position in which the rider's elbows are located near the original handlebar with the rider's arms extending forwardly toward the handgrip portions.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a side elevational view of a bicycle including an embodiment of the novel handlebar system;

FIG. 2 is a plan fragmentary view taken from a position above and forward of the bicycle shown in FIG. 1 with a rider in riding position;

FIG. 3 is a perspective fragmentary view illustrating another embodiment of the handlebar of the invention including an integral front loop portion;

FIG. 4 is a partially exploded perspective view of the handlebar of FIG. 1, including a detachable front loop portion;

FIG. 8 is a rear elevational view of the front loop portion of FIG. 6;

FIG. 9 is a front elevational view of a portion of the fastening structure along lines 9—9 of FIG. 7;

FIG. 10 is a sectional view of the front loop portion along lines 10—10 of FIG. 7;

FIG. 11 illustrates an adapter in accordance with the invention attached to an original conventional bicycle handlebar;

FIG. 12 is a fragmentary view of the adapter of FIG. 11 showing the manner of fastening to the original handlebar; and FIG. 13 is a plan view of another handlebar in accordance with the invention.

DETAILED DESCRIPTION

Figure 5:
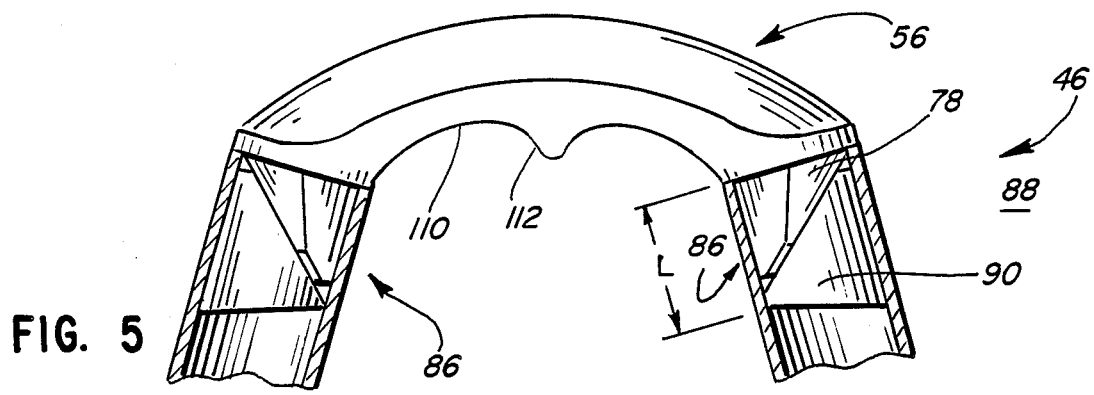
FIG. 5 is a partial sectional view along lines 5—5 of FIG. 4 illustrating the handlebar front loop portion.
Figure 6:
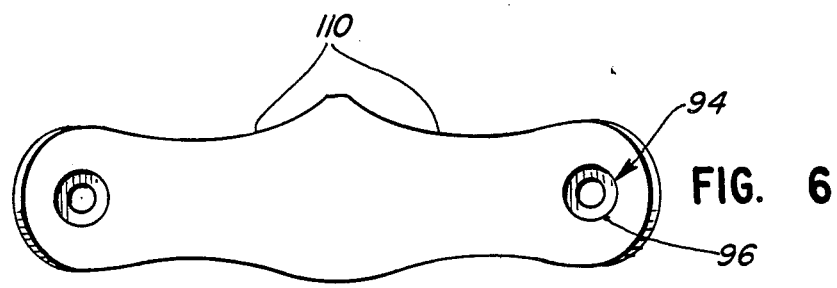
FIG. 6 is a front elevation view of the handlebar front loop portion in accordance with the invention.

While the invention will be described in connection with preferred embodiments, it will be understood that it is not intended to limit the invention to these embodiments. On the contrary, it is intended to cover all alternatives, modifications or equivalents as may be included within the spirit and scope of the invention as defined by the appended claims.

Referring to the FIGURES generally, and in particular to FIG. 1., there is shown a bicycle 10 which includes a triangular-shaped frame 12 comprised of a top tube 14, a down tube 16 and a seat tube 18. Seatstays 20 and chainstays 22 join to rigidly secure a rear wheel 24 and its axle 26. Extending from seat tube 18 is seat post 28. Mounted atop seat post 28 is a saddle 30. Seat post 28 may be raised or lowered into the seat tube to accommodate riders of differing heights. Top tube 14 and down tube 16 extend forwardly to a fork or head tube 32. Journaled within fork tube 32 is a stem 34 leading to front forks 36. Pedals 38 mounted to cranks 40 operate a drive sprocket 42 and a chain drive 44 in a known manner to propel the bicycle. A handlebar 46 in accordance with the invention is attached to stem 34.

Figure 7:
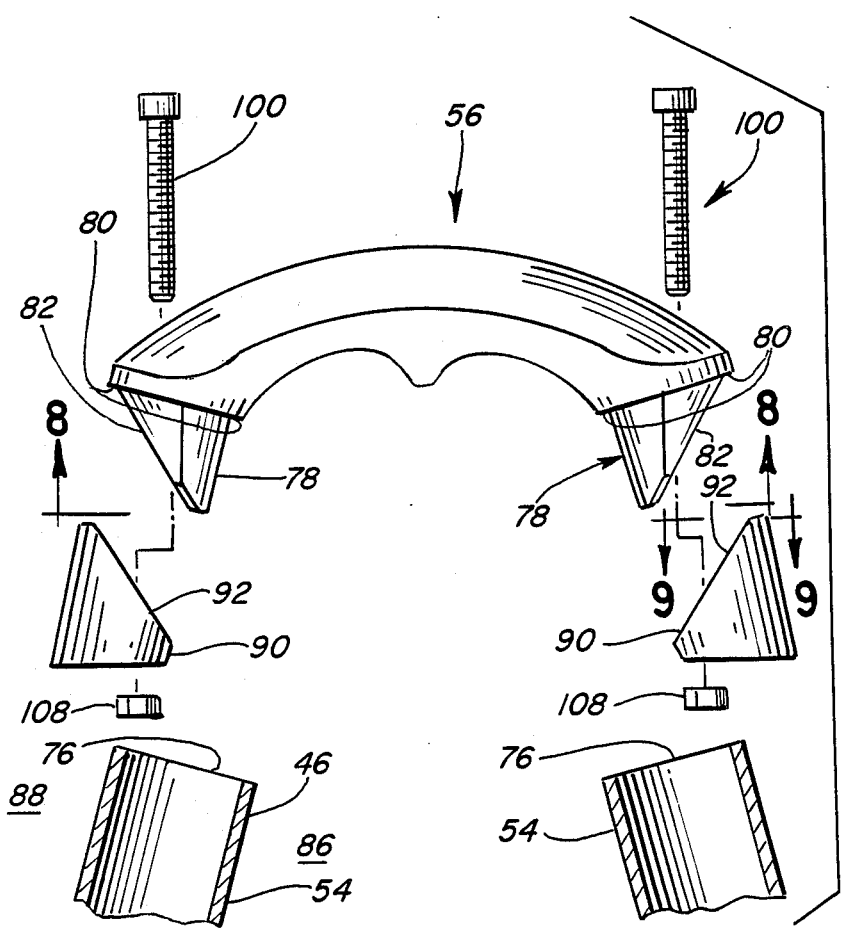
FIG. 7 is an exploded plan view of the front loop portion of FIG. 5 shown relative to the end portion of forwardly extending handlebars.

Handlebar 46 is shown in more detail in FIGS. 2, 4 and 7. FIG. 2 shows a rider R in riding position on bicycle 10, shown in fragmentary view and illustrating handlebar 46. FIG. 4 illustrates handlebar 46 in perspective view with only stem 34 of bicycle 10 being illustrated.

Handlebar 46 includes a crosspiece section 48 to which stem 34 is connected to a central portion of crosspiece section 48 by a stem clamp 50. Stem 34 may be raised or lowered relative to the head tube 32 by adjusting a stem bolt (not shown). Extending from opposite ends of crosspiece section 48 are turned portions 52 that extend generally forwardly and inwardly to define a pair of forward handle portions 54 located and adapted to be grasped in a known manner by a rider. A front loop portion 56 interconnects forward handle portions 54 so that handlebar 46 defines a continuous loop forward of the steering post. Front loop portion 56 may be a separate removable section as illustrated in FIGS. 1 and 2 and in detail in FIG. 4 or the front loop portion may form an integral part of the handlebar as illustrated in FIG. 3, where front loop portion 58 of handlebar 60 is an integral front loop portion. The other portions of handlebar 60 are the same as handlebar 46 illustrated in FIG. 4. Front loops 56 and 58 also provide a location where rider R can grip, as illustrated in FIG. 2, for example. Padding or other material, such as plastic, rubber or tape, for example, can be attached over front loop portion 58 and even over forward handle portions 54, if desired, to provide a desired shape to facilitate gripping by a rider. A pair of brake-operating levers 62 extend from brake hoods 64 located upon turned portions 52.

As illustrated in FIGS. 1 and 4, each of turned portions 52 include downwardly inclined bends 66 that extend below crosspiece section 48 followed by upwardly inclined bends 68 which extend into the pair of forward handle portions 54.

Forward handle portions 54 of handlebar 46, as illustrated in FIGS. 2 and 4 are relatively closely spaced and are spaced apart less than the width of crosspiece section 48. The center-to-center distance D between forward handle portions 54 is preferably about four inches. Also, forward handle portions 54 preferably extend upwardly to facilitate grasping by the rider. If desired, other portions of handlebar 46 can be grasped by the rider, such as crosspiece section 48 or turned portions 52.

In accordance with the invention, a small-frontal-area yet comfortable riding position is encouraged by providing novel forward handle portions 54 and 70 and front loop portions 56 and 72 which extend forwardly of the other portions of the handlebar, as illustrated particularly in FIGS. 1-4 and 11. Forward handle portions 54 are located so that, as illustrated in FIG. 2, when they are grasped by a bicycle rider R, the rider's forearms F are located to be supported by the handlebar 46 at positions over the crosspiece section 48. To this end, handlebar crosspieces can be provided with tapered padding material 74 or other forearm rests, if desired. Together, then, handlebar 46 and the position of saddle 30 and distance from handlebar 46 define a riding position in which the frontal area of the rider's silhouette is minimized, as especially suggested in FIG. 2. Furthermore, when the saddle and stem positions are properly adjusted so that the rider's back will be substantially straight and horizontal when grasping forward handle portions 54, wind resistance is further reduced and rider comfort is enhanced. In addition, in this position, it is believed that the weight distribution on the bicycle changes from rear bias to an approximately even weight distribution on the front and back tires. It is believed that such weight distribution provides decreased rolling resistance.

Moreover, the width W of the rider's silhouette is minimized by positioning the rider's forearms or elbows so as to be relatively close together, as is especially suggested in FIG. 2. To this end, the forearm rests 74 are each located rather closely adjacent the stem clamp 50. In this way, the maximum width W of the silhouette is simply that of the rider's shoulder width while in an extended position. The rider's arms and elbows do not extend outside this profile. In this position, the rider's arms and elbows do not contribute to increased frontal area and consequently wind drag is reduced. To further reduce wind resistance, forward handle portions 54 are located relatively close to one another. It has been found useful to locate these handles approximately four inches or less apart (center-to-center distance). The width W' of handlebars 46 can, of course, be greater or less than that shown in FIG. 2.

The chord length or straight line distance from crosspiece section 48 to end 76 of handlebar 46 is preferably on the order of twelve inches. Under these circumstances, as particularly illustrated in FIG. 2, the rider naturally assumes the position in which his forearms and upper arms are located directly ahead of his torso. Because the rider's arms are located head of his lungs, breathing constrictions are minimized or eliminated. There is no pinching of the chest, breathing is unobstructed because the elbows are ahead of the shoulder and the rider's weight can be on the handlebars, allowing the upper body to relax.

The rider may also wish to position his hands over forearm rests 74, adjacent to stem clamp 50, as is common during climbing. To this end, forearm rests 74 are preferably cylindrical and have an outside diameter only slightly greater than that of crosspiece portion 48. If desired, brake levers 62 could be located more closely adjacent forward handle portions 54. Of course, additional brake handle or actuating mechanisms could also be installed adjacent forward handle portions 54. The rider may also wish to position his hands along other portions of handlebars 46, 60 and 124. For example, the rider may position his hands: (1) at location 52' of turned portions 52; (2) at bottom location 52" of turned portions 52; (3) in position to grasp brake operating levers 62; (4) just forward of brake hoods 64 (forearms on or off forearm rests 74); and (5) any position forward of position (4) with forearms on forearm rests 74.

Handlebars in accordance with the invention, such as handlebars 46, 60 and 124 can be constructed of a single piece of tubing formed of aluminum or other suitable material. The ends of the tubing can terminate at the ends of forward handle portions 54 for handlebar 46 and at about midpoint 77 of crosspiece portion 48'. The preferred tubing is 6061-T6 aluminum tubing having an outside diameter of 24.0 millimeters and an inside diameter of 20.5 millimeters. The handlebars of the present invention can be readily constructed by bending the tubing into the desired shape. Suitable methods and techniques of bending tubing into a desired shape are well known to those skilled in the art and therefore a description of how to bend tubing to form the various desired handlebar shapes is not provided herein.

Referring to FIG. 5 there is illustrated in sectional view along lines 5—5 of FIG. 4 front loop portion 56, shown in assembled position on handlebar 46, which is partially illustrated. Front loop portion 56 is detachably connected to the ends of forward handle portions 54 or handlebar 46 by means suitable fasteners cooperating with suitable securing structure as more completely illustrated in FIGS. 7 and 11. Front loop portion 56 is molded of a plastic material into a solid unitary member. Of course, front loop portion 56 could be made of other materials known in the art and could be hollow, for example. Front loop portion 56 can be also used, for example, as an adapter for a bicycle having a handlebar with forwardly extending portions terminating in a pair of handgrips.

While the front loop portion can be attached to forward handle portions 54 by any structure or means known in the art, and can also be an integral part of the handlebar, as illustrated in FIG. 3, in the embodiment of FIG. 5, each of the ends of front loop portion 56 terminate with male connector portions 78 that are insertable into the end of forward handle portions 54, which is constructed from hollow tubing. Male connector portions are dimensional to be snugly fit into the ends of forward handle portions 54 and also include a shoulder 80 that extends circumferentially around front loop portion 56 where connector 78 is joined to the remainder of front loop portion 56, as shown in FIGS. 7 and 8.

Each connector 78 is configured to provide an inclined surface 82 at an angle less than 90° and preferably about 45° to interior wall 84 of forward handle portions 54 that is adjacent connector 78 when in position within forward handle portion 54, so that the length of connector 78 is greatest along the inner side 86 of forward handle portions 54 (indicated by "L") and least or essentially 0 at the outer side 88 of forward handle portions 54 to allow connector 78 to be easily inserted into forward handle portions 54 even though forward handle portions 54 are inwardly extending as illustrated in FIGS. 5 and 7.

Connectors are secured within forward handle portions 54 with connector extensions 90, which can be constructed of the same material used for front loop portion 56. Each connector extension 90 is dimensioned to fit snugly within forward handle portions 54 and are utilized to extend the length of male connector portions 78 longitudinally of each handle portion 54 in which connector extension 90 preferably has a surface 92 that is complementary to inclined surface 82 of male connector portion 78, to provide a secure fit.

Each end of front loop portion 56 and each connector extension 90 has a bore 94 therethrough. As illustrated in FIG. 10, bore 94 extends through connector portion 78 of front loop portion 72. Bore 94 preferably includes a countersunk portion 96 to receive head 98 of threaded bolt 100. Bore 94 includes an enlarged portion 102 that is slightly larger than the diameter of threaded bolt 100.

As illustrated in FIG. 9, a bore 104 extends through connector extension 90 and is coaxially aligned with bore 94 so that connector 78 and connector extension 90 are concentric to forward handle portions 54 when received therein. Preferably, the longitudinal axis of bores 94 and 104 are at an angle of about 15° from the longitudinal axis of forward handle portions 54. Bore 104 also includes an enlarged opening 106 that is complementary to threaded nut 108 allowing nut 108 to be press-fit therein. The forward portion 109 of connector extension 90 is truncated slightly to permit some movement of connector extension 90 relative to connector portion 78 during fastening as hereinafter described.

To assemble handlebar 46, a connector extension 90 with nut 108 press fitted therein is inserted into each forward handle portion 54. Thereafter, a connector 78 is inserted into each forward handle portion 54 and fastened to connector extension 90 with bolt 100. As bolt 100 is tightened, enlarged portion 102 of bore 94 allows connector 78 to be slightly deformed and connector extension 90 is urged forward and against inner wall 110 of forward handle portion 54, as illustrated in FIG. 10.

The shape of front loop portion 72 is illustrated in detail in FIGS. 5-8. Front loop portion 72 includes a pair of concave depressions 111 along the top and rear portions of front loop portion 72 which will facilitate grasping and provide resting areas for the rider's thumbs, as shown in FIG. 2. A central ridge 112 is located between depressions 111.

It is to be understood that the previously described structure for mounting front loop portion 72 to forward handle portions 54 can be modified in many ways. For example, the male connector portion 78 could be part of forward handle portions 54 and front loop portion 72 could be in the form of a hollow tube. Other types of connectors could also be used.

Another embodiment of the invention is illustrated in FIG. 11. In this embodiment, a handlebar system having the advantages mentioned above is provided as an accessory for original handlebars. As shown in FIG. 11, stem 34 is connected to original racing handlebars 120 at their crosspiece 122 by the stem clamp 50. Also connected to the crosspiece are an add-on handlebar 124 which extends in a substantially horizontal plane away from the stem, i.e. away from the bicycle rider. Add-on handlebar 124 is a generally U-shaped extension loop having at the ends of the loop a pair of clamp elements 128 for engaging original handlebars 120 on opposite sides of stem 34. Extension loop 126 projects forwardly from each clamp 128 and away from the rider and defines a pair of handgrip portions 70 near center neck or front loop portion 72 of U-shaped loop 126 to define a rider position in which the rider's elbows are located near original handlebar 120 with the rider's arms extending forwardly toward handgrip portions 70. Material (not shown) may be attached to front loop portion 72 and/or handgrip portions 70 as described with respect to handlebar 60.

Clamp element 128, as shown in more detail in FIG. 12, may consist of an upper portion 134 and a lower portion 136 which can be separated from upper portion 134. Upper portion 134 is threaded in at least two places on either side of a semi-spherical opening 138 in order to receive bolts 140. Located between bolts 140 in the lower portion 136 is a second semi-spherical opening 142 which aligns with semi-spherical opening 138. The spherical opening formed by adjoining the two semi-spherical openings is adapted to securely grip crosspiece 122 when bolts 140 are tightened. Clamp 128, such as that shown in FIG. 12, is preferable to, for example, a standard stem clamp since it allows the add-on handlebars 124 to be secured to the existing handlebars 120 without removing brake hoods 64.

While add-on handlebars 124 could extend outwardly from the crosspiece 122 at an angle exactly equal to 90°, it has been found more advantageous from both aerodynamic and comfort viewpoints to angle the bars inward toward one another such that the angle $\theta$ in FIG. 11 is equal to about 75°. In addition, it is preferable that handgrip portions 70 extend upwardly, most preferably at an angle of about 45° from horizontal on a radial bend of about three inches. With such a 45° upward turn, the chord length straight line distance from the end of an add-on bar to the center of the existing handlebars (dimension C in FIG. 11) should be in the range of nine to fourteen inches, and eleven inches for short model add-on bars and twelve inches for long model add-on bars in preferred. It is also desirable to space the clamps 128 so that the distance from the inside edge of one clamp to the inside edge of the second clamp (distance S in FIG. 11) is 4.75 inches. Such a spacing will provide a center-to-center forwardly extending handgrip width (distance T in FIG. 11) of about 3.25 inches. Such a tip width distance provides reduced wind resistance yet allows the rider to have effective steering control.

To increase rider comfort, forearm pads 144 are affixed to the crosspiece 122 on the outside of the clamps 128. As with the forearm rest 74 described above, the forearm rest 144 can be grasped by the rider so that he can steer the bicycle while in a climbing position, i.e. while having his hands on the crosspiece of the conventional handlebars. Forearm rest 144 is preferably comprised of a cylindrically-shaped foam piece which has been split (not shown) so that it can be placed upon crosspiece 122 without requiring removal of the brake hoods 64.

Another embodiment of the invention is illustrated in FIG. 13. Handlebar 146 is believed to be especially useful for mountain bikes and includes a crosspiece portion 148, turned forwardly and inwardly extending portions 150, front inwardly extending handgrip portions 152 and forwardly extending handgrip portions 154. Foam handgrips 156 and 158 are positioned on front inwardly extending handgrip portions and on crosspiece 148, respectively. Handgrips 158 can also function as forearm rests. Handlebar 146 lies in a substantially horizontal plane when mounted in riding position on a bicycle and provides various handgrip locations that are useful for mountain bikes. For example, the rider's hands may be placed: (1) adjacent stem clamp 50; (2) on foam grips 158 for operating brake levers 62, useful for descending and in all situations for best handling; (3) at outer end of forwardly and inwardly extending portions 150 for wide standing up riding; (4) on foam handgrips 156 for an extended arm position, especially during seated climbing where traction and front wheel lift-off are a problem; and (5) on forwardly extending handgrip portions 154, with forearms or elbows on handgrips 158.

I claim:

1. A bicycle handlebar connectable to a steering post located forwardly of a bicycle seat, comprising:
   a crosspiece having a central portion connectable with said steering post and sideways portions extending therefrom,
   turned portions extending from said sideways portions and extending generally forwardly and inwardly to define a pair of forward handle portions spaced apart a distance less than the width of the crosspiece, and
   a front loop portion interconnecting the forward handle portions whereby all of the portions define a continuous loop forward of the steering post.

2. The bicycle handlebar of claim 1 wherein the front loop portion is detachable and when removed the pair of forward handle portions form separate grip ends pointing generally forwardly and spaced relatively close together.

3. The bicycle handlebar of claim 2 wherein the separate grip ends are hollow, and the front loop portion includes a pair of male connector pieces insertable into the hollow grip ends to attach the front loop portion to the pair of forward handle portions.

4. The bicycle handlebar of claim 3 wherein each of the pair of male connector pieces includes expansion means manually adjustable to the connector within the hollow grip end to thereby firmly attach the front loop portion to the separate grip ends.

5. The bicycle handlebar of claim 1 wherein the pair of handle portions converge inwardly and forwardly to define a rider position in which the rider's forearms converge inwardly from the rider's shoulders and rest relatively close together on the sideways portions with the rider's hands being relatively close together while gripping the pair of forward handle portions.

6. The bicycle handlebar of claim 1 wherein a pair of inwardly tapered pads are secured to the sideways portions of the crosspiece and have a taper to urge a rider's forearms inwardly when resting on the pads with the rider's hands extending forwardly to grip the pair of forward handle portions.

7. The bicycle handlebar of claim 1 wherein the turned portions include downwardly inclined bends extending below the crosspiece followed by upwardly inclined bends which extend into the pair of forward handle portions.

8. The bicycle handlebar of claim 7 wherein the upwardly inclined bends also taper inwardly.

9. The bicycle handlebar of claim 7 wherein the pair of forward handle portions are also inclined upwardly so that the front loop portion is above the crosspiece.

10. The bicycle handlebar of claim 1 including a pair of hand brake mechanisms located on the turned portions and having brake levers extending generally parallel to portions of the turned portions.

11. An adapter for a bicycle having a handlebar with forwardly extending portions terminating in a pair of handgrips spaced relatively close together and pointing forwardly, comprising:

a handle bar member including a body with a pair of connector means, each connector means being detachably connectable with the associated one of the pair of forwardly pointing handgrips for interconnecting the pair of handgrips through the body of the handlebar member to form a front loop portion at the forward most extent of the handgrips.

12. The adapter of claim 11 wherein one of the pair of handgrips and pair of connector means are formed by a hollow tube and the other of the pair of handgrips and pair of connector means have male connector pieces insertable into the hollow tube to thereby attach the member to the handgrips.

13. The adapter of claim 12 wherein each of the male connector pieces include extension means mountable to said male connector within the hollow tube to thereby firmly attach the handlebar member to the handgrips.

14. The adapter of claim 11 wherein said connector means comprise a male connector member at each end of said handlebar member, each member being insertable into a hollow end of the handgrips.

15. The adapter of claim 11 wherein the handlebar member interconnects the ends of the pair of handgrips.

16. An adapter for a bicycle having a handlebar with forwardly and inwardly extending portions terminating in a pair of hollow handgrips, comprising:
a handlebar member including a generally elongated body having at each end a reduced diameter connector protrusion, each protrusion being snugly insertable into one of the hollow handgrips, and detachable means for detachably securing each connector protrusion within the hollow handgrip to thereby define a continuous loop for the handlebar.

17. The adapter of claim 16 wherein the handlebar member is formed of a plastic material, and the detachable means comprises a threaded expander screw within a threaded bore in the plastic material.

18. An adapter kit for a bicycle having an original handlebar connected to a steering post, comprising:
a generally U-shaped extension loop having at the ends of the loop a pair of clamps for engaging the original handlebars on opposite sides of the steering post, the extension loop projecting forwardly from each clamp and away from the rider and defining a pair of handgrip portions near the center neck of the U-shaped extension loop to define a rider position in which the rider's elbows are located near the original handlebar with the rider's arms extending forwardly toward the handgrip portions.

19. The adapter kit of claim 18 wherein the handgrip portions extend upwardly.

20. The adapter kit of claim 18 further comprising a pair of pads securable to opposite portions of said original handlebar to form a pair of forearm rests.

21. The adapter kit of claim 20 wherein said pads are inwardly tapered so that when mounted on the original handlebar said pads taper to urge a rider's forearms inwardly when resting on the pads with the rider's hands extending forwardly to grip the pair of handgrip portions.

22. The adapter kit of claim 20 wherein said adapter kit defines a rider position in which the rider's forearms converge inwardly from the rider's shoulders and rest relatively close together on the sideways portions with the rider's hands being relatively close together while gripping the pair of forward handle portions.

23. The adapter kit of claim 18 wherein said handgrip portions are spaced apart a distance of about four inches or less.

24. The adapter kit of claim 18 wherein each clamp is located between the rider's elbows when the rider is in the rider position with the rider's hands gripping the handgrip portions.

25. A bicycle comprising a frame, a rear wheel journaled to the frame, a steering post journaled to the frame, a front fork attached to the steering post, a front wheel journaled to the fork, a saddle affixed to the frame at a predetermined position above the frame, and handlebars connected to the steering post, the handlebars including a crosspiece having a central portion connected to said steering post and sideways portions extending therefrom,
turned portions extending from said sideways portions and extending generally forwardly and inwardly to define a pair of forward handle portions spaced apart a distance less than the width of the crosspiece, and
a front loop portion interconnecting the forward handle portions whereby all of the portions define a continuous loop forward of the steering post.

26. The bicycle of claim 25 wherein the front loop portion is detachable and when removed the pair of forward handle portions form separate grip ends pointing generally forwardly and spaced relatively close together.

27. The bicycle of claim 26 wherein the separate grip ends are hollow, and the front loop portion includes a pair of male connector pieces insertable into the hollow grip ends to attach the front loop portion to the pair of forward handle portions.

28. The bicycle of claim 27 wherein each of the pair of male connector pieces includes expansion means manually adjustable to the connector within the hollow grip end to thereby firmly attach the front loop portion to the separate grip ends.

29. The bicycle of claim 25 wherein the pair of handle portions converge inwardly and forwardly to define a rider position in which the rider's forearms converge inwardly from the rider's shoulders and rest relatively close together on the sideways portions with the rider's hands being relatively close together while gripping the pair of forward handle portions.

30. The bicycle of claim 25 wherein a pair of inwardly tapered pads are secured to the sideways portions of the crosspiece and have a taper to urge a rider's forearms inwardly when resting on the pads with the rider's hands extending forwardly to grip the pair of forward handle portions.

31. The bicycle of claim 25 wherein the turned portions include downwardly inclined bends extending below the crosspiece followed by upwardly inclined bends which extend into the pair of forward handle portions.

32. The bicycle handlebar of claim 31 wherein the upwardly inclined bends also taper inwardly.

33. The bicycle handlebar of claim 31 wherein the pair of forward handle portions are also inclined upwardly so that the front loop portion is above the crosspiece.

34. The bicycle handlebar of claim 25 including a pair of hand brake mechanisms located on the turned portions and having brake levers extending generally parallel to portions of the turned portions.

35. The bicycle of claim 25 wherein said handlebars are formed from a single length of tubing.

36. A bicycle handlebar for a steering post located forwardly of a bicycle seat, comprising:
- a crosspiece having a central portion connectable with said steering post and sideways portions extending therefrom,
- a continuous front loop extending forwardly from the crosspiece and including forwardly extending bars interconnected by a front U-shaped loop, the bars defining near the front U-shaped loop handgrip portions which turn upwardly above the crosspiece to define a rider position in which the rider's elbows are located near the crosspiece and the rider's arms extend forwardly with the rider's hands being relatively close together and inclined upwardly when grasping the handgrip portions near the front U-shaped loop.

37. The bicycle handlebar of claim 36 wherein the forwardly extending bars extend in a range from nine inches to fourteen inches from the center of the crosspiece to the handgrip portions near the U-shaped front loop.

38. The bicycle handlebar of claim 36 wherein the handgrip portions have a center-to-center distance therebetween, near the U-shaped front loop, of approximately four inches.

39. The bicycle handlebar of claim 36 wherein the sideways portions of the crosspiece extend into turned portions extending forwardly and inclined downwardly below the crosspiece followed by an upwardly inclined bend which extends into the forwardly extending bars of the continuous front loop.

40. The bicycle handlebar of claim 36 including a pair of tapered pads secured to the sideways portion of the crosspiece for supporting the rider's forearms and having a taper to urge inwardly the forearms when resting on the pads with the rider's hands extending forwardly to grip the handgrip portions.

41. The bicycle handlebar of claim 36 wherein the front U-shaped loop is detachable and comprises a body having at the U-shaped ends thereof a pair of male connectors and the forwardly extending bars comprise hollow tubes into which the male connectors are insertable to thereby attach the body and form the continuous front loop.

42. The bicycle handlebar of claim 36 wherein the continuous front loop includes at the rear of the forwardly extending bars a pair of clamps for detachable engagement with the crosspiece whereby the continuous front loop forms an add-on extension to an original pair of handlebars which include the crosspiece.

* * * * *